United States Patent
Sabo

(10) Patent No.: US 11,245,947 B1
(45) Date of Patent: Feb. 8, 2022

(54) DEVICE AND METHOD FOR CAPTURING, PROCESSING, LINKING AND MONETIZING A PLURALITY OF VIDEO AND AUDIO RECORDINGS FROM DIFFERENT POINTS OF VIEW (POV)

(71) Applicant: Theodore Joseph Sabo, Miami, FL (US)

(72) Inventor: Theodore Joseph Sabo, Miami, FL (US)

( * ) Notice: Subject to any disclaimer, the term of this patent is extended or adjusted under 35 U.S.C. 154(b) by 0 days.

(21) Appl. No.: 16/169,980

(22) Filed: Oct. 24, 2018

Related U.S. Application Data

(60) Provisional application No. 62/576,131, filed on Oct. 24, 2017.

(51) Int. Cl.
| | |
|---|---|
| *H04N 21/2743* | (2011.01) |
| *H04N 21/2187* | (2011.01) |
| *H04N 21/2365* | (2011.01) |
| *H04N 21/4223* | (2011.01) |
| *H04N 21/433* | (2011.01) |
| *H04N 21/4784* | (2011.01) |

(52) U.S. Cl.
CPC ..... *H04N 21/2743* (2013.01); *H04N 21/2187* (2013.01); *H04N 21/2365* (2013.01); *H04N 21/4223* (2013.01); *H04N 21/4334* (2013.01); *H04N 21/4784* (2013.01)

(58) Field of Classification Search
CPC ............. H04N 21/21805; H04N 21/27; H04N 21/274; H04N 21/2743; H04N 21/278; H04N 21/4784
See application file for complete search history.

(56) References Cited

U.S. PATENT DOCUMENTS

| | | | |
|---|---|---|---|
| 2013/0205341 A1* | 8/2013 | Jabara | H04L 69/164 725/39 |
| 2015/0227513 A1* | 8/2015 | Sathish | H04N 21/858 707/769 |
| 2017/0150197 A1* | 5/2017 | Zograbian | G06Q 30/0207 |

* cited by examiner

*Primary Examiner* — Hsiungfei Peng
*Assistant Examiner* — Fred Peng
(74) *Attorney, Agent, or Firm* — David P. Lhota, Esq.; Lhota & Associates, P.A.

(57) ABSTRACT

A mobile communication device having a processor and set of processor readable code of instructions that identifies and enables multiple mobile communication devices in a predetermined geographic region (geo-fence) to simultaneously capture audio video recordings (the "recordings") of an event or scene from varying POV in the same time and space and automatically uploads the recordings to a remote server which bundles, processes and optimizes the plurality of audio video recordings for distribution and monetization. The instant invention provides instant access to the recording feature when opened and allows a limited amount of recording time, such as up to sixty (60) seconds to record a particular event in desired region. Audio is also captured during the recording. A user may be given a predetermined amount of time, such as five (5) seconds, to delete the recording. The instant invention streamlines and processes the collected videos and audios of the same event to remove visual and audio harmonics and irregularities. The instant invention also identifies mobile devices nearest a preidentified area of an event of interest and pushes an alert to these devices offering a recording opportunity of the event to the users which may be accepted so as to record and upload the event while encouraging proximal users to also record and upload the event from their unique POV.

14 Claims, 13 Drawing Sheets

DEVICE AND METHOD FOR CAPTURING, PROCESSING, LINKING AND MONETIZING A PLURALITY OF VIDEO AND AUDIO RECORDINGS FROM DIFFERENT POINTS OF VIEW (POV)

CROSS-REFERENCE TO RELATED APPLICATION

This application claims the benefit of provisional patent application Ser. No. 62/576,131 filed Oct. 24, 2017.

STATEMENT REGARDING FEDERALLY SPONSORED RESEARCH OR DEVELOPMENT

N/A

FIELD OF THE INVENTION

The present invention relates to a mobile digital video and audio content recording and processing device and method, and in particular, to a mobile digital content and intelligent video and, or audio capturing, processing, optimizing, communication and monetizing method and device that identifies and enables multiple mobile communication devices in the proximity of a random or preidentified event based on a predetermined geographic region (geo-fence) to simultaneously record or capture an event or scene from varying points of view (POV) in the same time and space and automatically uploads and bundles the plurality of video recordings to a remote server and processes, edits and optimizes the video recordings for distribution and monetization. The invention may be embodied in a wireless communication device, such as a cell phone, IPhone, iPad, android, police body cam or similar devices, or a wired communication device, such as a security camera or other fixed video/audio recording device, and may also track and monitor contributors of recordings, allow users to register as contributors and invite contributors to register with the entity that uploads, bundles and processes the recordings.

BACKGROUND OF THE INVENTION

Since the advent of smart phones and other mobile communication devices that can record video, recording live events has never been more popular and desired. For instance, news stations, police departments, YouTube, television, cable programs and other entertainment venues benefit from newsworthy, noteworthy, interesting and moving videos recorded by average citizens. The problem, however, is that recordings received are so random and limited in POV or not tagged to be searchable that they often miss presenting important events or aspects of an important event in an efficient and rapidly accessible way. Also, capturing an important or interesting event, even when recorded is lacking the proper perspective and angle. Part of the problem is that not enough people record events that should be recorded or when recording is doing so from disadvantaged positions. If more people recorded events or were encouraged to record events, more videos would be available from multiple points of view (POV). Unfortunately, there is no adequate incentive system or method that encourages and rewards more people to record live newsworthy or interesting events occurring in their vicinity for the commercialization and monetization.

Another problem exists with receiving and processing multiple videos. There are times when multiple videos may be submitted to an interested organization, but they are difficult to piece together or reconcile. Coordinating the times of the videos taken simultaneously and sequentially is difficult as is matching the audio recordings with the video recordings. It is virtually impossible to create a seamless video audio recording from a plurality of different recordings taken from different angles, positions and times. In order to do so would require the proper processing and editing of multiple video and audio recordings to remove harmonics, overruns, static, gaps in time and overlaps. If such a device, system or method existed that could achieve these objectives it would be welcomed by multiple institutions including law enforcement, fire investigators, news organizations, entertainment outlets and others.

A variety of interactive, searchable and sharable video systems or methods are known in the background art. For instance, U.S. Pat. Nos. 9,684,432 and 8,566,353 issued to Fink, et al. ("the Fink Patents") disclose systems and methods for adding and displaying interactive annotations for existing online hosted videos. A graphical annotation interface allows the creation of annotations and association of the annotations with a video. Annotations may be of different types and have different functionality, such as altering the appearance and/or behavior of an existing video, e.g. by supplementing it with text, allowing linking to other videos or web pages, or pausing playback of the video. Authentication of a user desiring to perform annotation of a video may be performed in various manners, such as by checking a uniform resource locator (URL) against an existing list, checking a user identifier against an access list, and the like. As a result of authentication, a user is accorded the appropriate annotation abilities, such as full annotation, no annotation, or annotation restricted to a particular temporal or spatial portion of the video.

U.S. Pat. No. 9,324,014 ("the '014 Patent") discloses a method and system for augmenting images in physical documents with additional digital media content is described. A user device can scan the images and automatically retrieve and render the associated digital media content. Combinations of photographs, audio, maps and videos may be generated to allow users to create a cohesive interactive story. Some aspects of the disclosure involve gathering content to generate a physical document with augmented images, analyzing images for suitability to be augmented, linking images with digital media content, and generating augmented images from digital media content such as digital images, videos, and maps.

U.S. Pat. No. 8,341,152 ("the '152 Patent") discloses a method and system for generating and linking keywords to objects in videos, and then providing an internet searchable web page is disclosed. The objects also may be associated with hyperlinks to further information, further objects, or further videos or web pages. First, objects within a video are selected. Then software for tracking the objects throughout a video is used to determine in which frames the object appears. Data corresponding all frames in which the object first appears and last appears is determined. Second, an object descriptor term or phrase is associated with the object. The object descriptor is then used to generate a set of keywords, which along with the object descriptor, are stored in memory in association with the object and video, preferably an XML file or other format. Then, the keywords or keyword phrases are converted to a search engine searchable computer language, e.g., HTML, CSS, and posted to a web page. When a user searches the internet using a search term that sufficiently matches, in accordance with the search engine's search strategy, keywords (or the object descriptor itself which should be included in the set of searchable keywords in a searchable language) that are associated with an object in a video, the results will include a listing with a link to the video or videos at the video segment in which the object appears. The video thus can start playing at the first frame the object appears in and may end at the last frame the object appears in.

U.S. Pat. No. 9,195,429 ("the '429 Patent") discloses a system and method implementing a multi-user display linking multiple independent software processes with remote mobile devices is disclosed. The system/method augments multiple planes of conventional video graphics memory (VGM) controlled by a video graphics controller (VGC) in a host computing context (HCC) with a plane selection register (PSR) that enables isolation of individual planes of video memory within the VGM. The PSR is associated with a process mapping table (PMT) that maps in hardware a user process identification (PID) associated with an individual software process running within the HCC under control of a host operating system (HOS). HOS process context changes update the PSR with PMT content corresponding to an active HCC PID. A video graphics encoder (VGE) inspects areas of change within individual VGM planes and emits these changes as streaming video content to an Ethernet interface communicating with remote mobile devices associated with the HCC PIDs.

U.S. Pat. No. 9,367,864 ("the '864 Patent") discloses an exemplary method that involves: (a) a server system facilitating an experience sharing session between a sharing device and one or more viewing devices, wherein the server system receives media in real-time from the sharing device and transmits the media to the one or more viewing devices in real-time, wherein the media comprises video; (b) during the experience sharing session, the server system receiving one or more comments from one or more of the viewing devices; (d) the server system filtering the received comments in real-time based on filter criteria; and (e) the server system initiating real-time delivery, to the sharing device, of one or more of the received comments that satisfy the filter criteria.

U.S. Pat. No. 8,510,774 ("the '774 Patent") discloses a terminal that can acquire information required for an image configuration by accessing actual Electronic Service Guide (ESG) information using linking information when broadcast providers transmit Lightweight Application Scene Representation (LASeR) content including the linking information related to the LASeR content and the ESG information provided in a Digital Video Broadcasting-Handheld (DVB-H) Convergence of Broadcast and Mobile Services (CBMS), Open Mobile Alliance Broadcasting (OMA-BCAST) or Open Air Interface (OAI) standard. The broadcast providers can directly control a configuration of a broadcast image to be displayed on the terminal, such that differentiated broadcast images can be provided on a broadcast provider-by-broadcast provider basis.

U.S. Pat. No. 9,578,365 ("the '365 Patent") discloses a video sharing method for automatic video recording and for sharing recorded videos, comprising: registering specialized equipment and users; accepting and storing video files and music files; building searchable databases of uploaded video and music files; accepting user requests; selecting a music file; playing video files accompanied with the selected music file; and soliciting and accepting user feedback. A system plays video files at a user's request accompanied with music clips if desired.

U.S. Pat. No. 9,513,793 ("the '793 Patent") discloses a computer implemented method performed by an electronic device connected to a plurality of other devices. The electronic device comprises a display and an input device for receiving user input. The method comprises receiving a predefined user input at the electronic device, causing the display of information at the plurality of connected devices in response to receiving the predefined user input, and preventing the plurality of connected devices from causing the information to not be displayed.

U.S. Pat. No. 9,405,503 ("the '503 Patent") discloses a plurality of spatial publishing objects (SPOs) is provided in a multidimensional space in a user interface. Each of the plurality of spatial publishing objects is associated with digital media data from at least one digital media source. The user interface has a field for the digital media data. A user is provided via the user interface with a user presence that is optionally capable of being represented in the user interface relative to the plurality of spatial publishing objects. The digital media data associated with the at least one spatial publishing object are combined to generate a media output corresponding to the combined digital media data.

U.S. Pat. No. 8,893,010 ("the '010 Patent") discloses an exemplary computer-implemented method that involves a computing device: (a) causing a graphic display to display a user-interface for accessing one or more experience-sharing sessions, wherein the user-interface is associated with a first user-account; (b) determining a location; (c) initiating a location-based search for one or more associated experience-sharing sessions, wherein each associated experience sharing session involves at least one second user-account that has a confirmed association with the first user-account, and wherein the location-based search is based on the determined location; and (d) causing the graphic display to display at least a portion of each of one or more associated experience-sharing sessions that result from the location-based search.

U.S. Pat. Nos. 8,868,374 and 8,615,257 issued to Khosrav et al. ("the Khosravy Patents") disclose a directional information and gesture-based input in a location based services environment where a variety of service(s) can be provided on top of user identification or interaction with specific object(s) of interest. For instance, when a user gestures at or points at a particular item, or gestures at a particular location or place, this creates an opportunity, e.g., an advertising opportunity, for anyone having an interest in that particular item or place to communicate with the user regarding that item or related items at a point in time when the user's focus is on the particular item. User context for the interaction can also be taken into account to supplement the provision of one or more interactive direction-based services.

U.S. Publication Nos. 2016/0125839 and 2015/0254048 filed by Morton et al. ("the Morton Publications") disclose a system and method implementing a multi-user display linking multiple independent software processes with remote mobile devices is disclosed. The system/method augments multiple planes of conventional video graphics memory (VGM) controlled by a video graphics controller (VGC) in a host computing context (HCC) with a plane selection register (PSR) that enables isolation of individual planes of video memory within the VGM. The PSR is associated with a process mapping table (PMT) that maps in hardware a user process identification (PID) associated with an individual software process running within the HCC under control of a host operating system (HOS). HOS process context changes update the PSR with PMT content corresponding to an active HCC PID. A video graphics encoder (VGE) inspects areas of change within individual VGM planes and emits these changes as streaming video content to an Ethernet interface communicating with remote mobile devices associated with the HCC PIDs.

U.S. Publication No. 2012/0260298 ("the '298 Publication") discloses method and system for sharing video among mobile terminals. The method comprises: a calling terminal uploads a video file to a media server; a called terminal establishes a video link with the media server through a mobile network; the media server sends a video stream to the called terminal through the video link; the called terminal receives the video stream from the media server and plays the video file. The method and system provided by the present invention enable simultaneous sharing of the same video among multiple called terminals and enable a called terminal to watch the same shared video multiple times, therefore not only time and labor are saved, but also user experience is enhanced. By playing shared video through a mobile network, stream media is played directly and more smoothly, and problems of video buffering and video stagnating in video sharing are solved.

The above noted patents and publications fail to disclose, suggest or motivate, individually or in combination, a mobile digital video and audio content recording and processing device and method that identifies and enables multiple mobile communication devices in a predetermined geographic region (geo-fence) to simultaneously record or capture video and, or audio of an event or scene from varying POV (individually and collectively referenced herein as "recording" or "recordings") in the same time and space, automatically uploads and bundles the plurality of recordings to a remote server and processes the collected videos to streamline the videos by removing visual and audio harmonics and irregularities to provide a seamless video for distribution and monetization. They also fail to disclose or suggest an device, system or method that provides instant access to the video recording features when opened to allow a limited amount of recording time to record a particular event in desired region, the ability to delete the recording in a predetermined amount of time before it is uploaded to a server, identifies mobile devices nearest a preidentified area of an event of interest and pushes an alert to these mobile devices offering a recording opportunity of the event to the users which may be accepted so as to record and upload the event while encouraging proximal users to also record and upload the event from their unique POV. The background devise and methods also fail to provide instant editing to create a single recording from multiple submissions and real-time analytics that allows a contributor to witness in real time the viewership, licensing and economic benefits, author verification, content verification, electronic press credentials, simulcast handshaking that allows a producer or director to take control of the recording or influencer or advertising assignments. Moreover, the above noted patents and publications fail to disclose or suggest video swarming by allowing users to ping other nearby mobile devices to invite them to record an event that they are not currently recording or a pixel chaser and video tagging feature that allows a contributor or user to touch pixels of an object or person in the video so as to tag the object or person for searching purposes, time stamping or geographic stamping. In addition, there are no systems known that require a licensing agreement for its users thereby preapproving the monetization and capitalization of their recorded content. The foregoing patent and publication disclosures, individually and in combination, simply fail to disclose, suggest or motivate all the features of the instant invention.

If such a mobile digital video and audio content recording and processing device and method having all the above noted features it would be well received. It is therefore desirable to have such a device and, or method that effectively and reliably captures, receives, processes, optimizes and links seamlessly a plurality of audio video recordings with all the above noted features while also encouraging the taking of more audio video recordings by others. The instant invention addresses these unfulfilled needs in the prior art by providing a mobile digital video and audio content recording and processing device and method, which may include a mobile communication software, app and, or platform, for mobile communication devices that rewards the taking and uploading of audio video recordings and receiving, processing and linking these various recordings as contemplated by the instant invention disclosed.

SUMMARY OF THE INVENTION

In accordance with one aspect, the present invention provides a mobile communication device having a processor and set of processor readable code of instructions that identifies and enables multiple mobile communication devices in a predetermined geographic region (geo-fence) to simultaneously capture audio video recordings (the "recordings") of an event or scene from varying POV in the same time and space and automatically uploads the recordings to a remote server which bundles, processes and optimizes the plurality of audio video recordings for distribution and monetization. The instant invention provides instant access to the recording feature when opened and allows a limited amount of recording time, such as up to sixty (60) seconds to record a particular event in desired region. Audio is also captured during the recording. A user may be given a predetermined amount of time, such as five (5) seconds, to delete the recording. The instant invention streamlines and processes the collected videos and audios of the same event to remove visual and audio harmonics and irregularities. The instant invention also identifies mobile devices nearest a preidentified area of an event of interest and pushes an alert to these devices offering a recording opportunity of the event to the users which may be accepted so as to record and upload the event while encouraging proximal users to also record and upload the event from their unique POV. The instant invention may further provide instant editing to create a single recording from multiple submissions and may provide real time analytics that allows a contributor to witness in real time the viewership, licensing and economic benefits. The invention facilitates video swarming by allowing users to ping other nearby mobile devices to invite them to record an event that they are not currently recording. Users may narrate the event and add field notes. A pixel chaser and video tagging feature of the Invention allows a contributor to touch pixels of an object or person in the video so as to tag the object or person for searching purposes. The instant invention may also provide session file management for "Time" and "Space" linkage of content captured for all relevant video and audio from a plurality of recordings by users of any desired event while tracking the contributions, user ID, session ID, time stamping, geographic-stamping and quantity of POV by any particular user(s) or contributor (s) in a session which are sequential based on the upload time stamp and, or geographic stamp. The instant invention may further include a worldview of the net result of the endless contributions that are made available through searchable tagging, geography, user, time and space sessions.

In an additional aspect, the present invention provides a mobile digital video and audio content recording and processing device and method that includes author or user device verification, content verification; linkage of registered users by Time and Space, linkage of content by Time and Space, instant editing that creates a real-time edit of video and audio including content merging, sixty second auto-audio capture, providing electronic press credentials during user verification that can be verified by a QR code or numeric sequence, real time analytics for the author, author journalism education, video swarming, a designated number of POV that pushes authors/contributors to send recordings at a maximum number of angles, a story telling feature that encourages contributors to dictate or take a 'selfie" of the event, field notes, pixel chaser video tagging, session file management, hypertags, relevance hashtags and hypertags, an instant account that allows a contributor to collect payments, simulcast handshake that allows a producer or director to manage or takeover control of a real time video session for recording, a global live view that allows producers and editors to globally tune into raw audio video recording feeds being uploaded so they can be broadcast live, a cortex worldview feature of endless contributions that allows searchable tagging, 360 degree painting that provides a 360 degree view, a time capsule of all or selected recordings, and a channeling feature wherein all author content edits with watermarks and hypertags for licensing and download when shown on existing video platforms and social media platforms.

In another aspect, the present invention provides a method for identifying and enabling multiple mobile communication devices in a predetermined geographic region (geo-fence) to simultaneously capture audio video recordings (the "recordings") of an event or scene from varying POV in the same time and space and automatically uploads the recordings to a remote server which bundles, processes and optimizes the plurality of audio video recordings for distribution and monetization; to provide instant access to the recording feature when opened and allows a limited amount of recording time, such as up to sixty (60) seconds to record a particular event in desired region; to capture an audio recording; to give a user a predetermined amount of time, such as five (5) seconds, to delete the recording; to streamline and process the collected audio videos of the same event to remove visual and audio harmonics and irregularities; identify mobile devices nearest a preidentified area of an event of interest and pushes an alert to these devices offering a recording opportunity of the event to the users which may be accepted so as to record and upload the event while encouraging proximal users to also record and upload the event from their unique POV; to provide instant editing to create a single recording from multiple submissions and may provide real time analytics that allows a contributor to witness in real time the viewership, licensing and economic benefits; to facilitate video swarming by allowing users to ping other nearby mobile devices to invite them to record an event that they are not currently recording; to allow users to narrate the event and add field notes; to provide a pixel chaser and video tagging feature that allows a contributor to touch pixels of an object or person in the video so as to tag the object or person for searching purposes; to provide session file management for "Time" and "Space" linkage of content captured for all relevant video and audio from a plurality of recordings by users of any desired event while tracking the contributions, user ID, session ID, time stamping, geographic-stamping and quantity of POV by any particular user(s) or contributor(s) in a session which are sequential based on the upload time stamp and, or geographic stamp; and, or to include a worldview of the net result of the endless contributions that are made available through searchable tagging, geography, user, time and space sessions.

In further aspects and objects, the instant invention provides a mobile digital video and content recording, processing and monetizing device and method that simplifies the capture, cataloguing, distribution, promotion, licensing and monetization of some of the most important newsworthy stories in the world increasingly seen through the eyes of regular people, i.e. citizen journalists, and that ranks contributors based on the number of contributions, viewership contributions, syndicated pieces, most money earned and most likes.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1A:
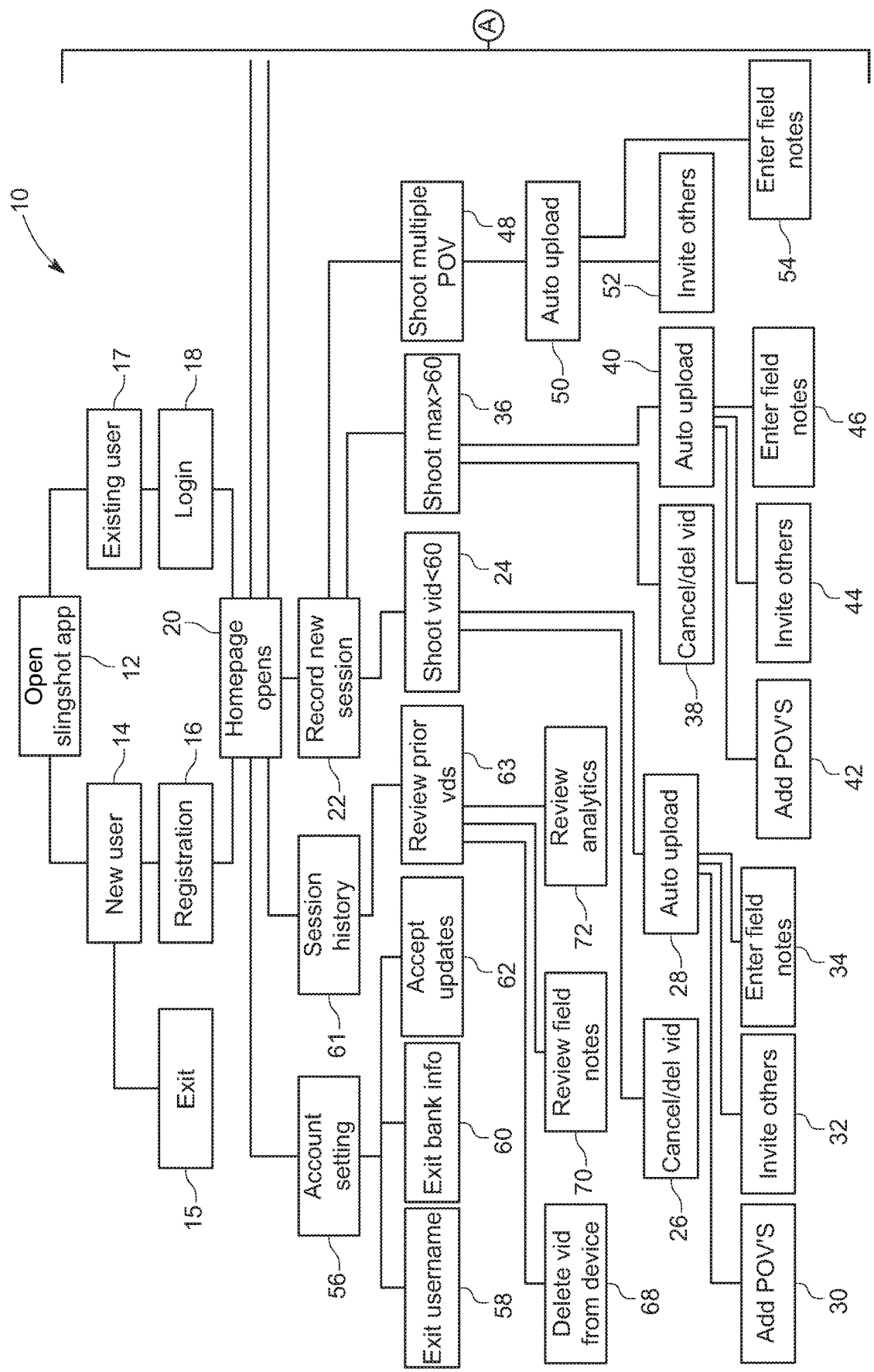
FIG. 1A and FIG. 1B is a flow diagram of method and process of the mobile communication app system of the present invention.

With reference to the drawings in which like reference designators refer to like elements, FIGS. 1A to 12 depict the preferred and alternative embodiments of the instant invention which is generally referenced as a mobile communication device, system, app or method and, or by numeric character 10 or 100. The instant invention 10 provides a mobile communication device having a digital content and intelligent code of instructions that assists individuals (referenced herein as "contributor(s)", "author(s)" or "user(s)") to capture, optimize and monetize video or audio video recordings (referenced herein as "recording" or "recordings"). All user content of a single subject in the same time and space is edited into a single edit or file content and may be automatically combined with other author's content when multi-user content is available in the same time/space geofence. All user video and audio is uploaded to the instant invention 10 server in "live packets" so that if interrupted there is still data sent. All video is edited, optimizing both image and audio mixing, and geo-triangulating the subject (s) in the video recordings to get closeups and wide shots for multiple recordings at different POV, optimally five (5) clips of edited stories using, artificial intelligence (AI) to enhance the relevance to its audiences. Recorded content can be user initiated, recommended by fellow users, push alerts to the device 10 based on real time intelligence of something happening in an area or mission, based on a proposal and budget wherein a user can accept and get paid for the contribution once the exclusive video is approved. Recorded content may be used for news, insights, analytics, investigations, fun, education and cataloguing the world at all times in all places. The instant invention 10 includes original video captured for the purposes of exposing and monetizing everything important and interesting for registered users for the sole intent of licensing and monetizing the captured video. All contributors may license their recordings to a predetermined entity to monetize their copyrighted material through distribution/ad dollars, syndication, commercialization and other financial means. An author may open the instant invention 10, instantly access the video record feature and have a maximum of 60 seconds to capture what they think the world should see in a POV. In any POV the system 10 automatically uploads partial clips that get eliminated if and when a completed POV arrives to the server with the same timecode and GPS location thereby replacing the partial stories. The user is pushed to record more than one POV of any subject to increase the chances of a compelling story of their subject matter. Audio is captured for the duration of a session (60 seconds), even when video is not, to bring ambient noises and reactions into the "story." When recording is done the user has 5 seconds to cancel the otherwise automatic upload of their video to servers connected to editors, translators and a digital platform for effective and purposeful distribution and monetization. The user shares in a revenue stream that comes from the licensing, syndication and ad dollars earned using their video. The user and a designated entity may share both revenue and intellectual property rights in the recordings submitted. All recordings may be hosted/stored by the controlling entity for the purposes of archiving the content for future uses as well as create a library of "stock video" for sale, a news show highlighting the best clips, an AI newsfeed available online streaming real time clips from the entire authorship worldwide and for a global "time capsule" that will be a record for all things happening around the world searchable by time and location, past and present or by author. Each recording uploaded will be supported by "Field Notes" that can include titling, text and even a voice summary of what they witnessed. Once uploaded and available for distribution the user can track real time viewership/usage and actual revenue earned on any contribution or an overall aggregate account based on revenue earned on all their contributions in a section called "Analytics".

Figure 3:
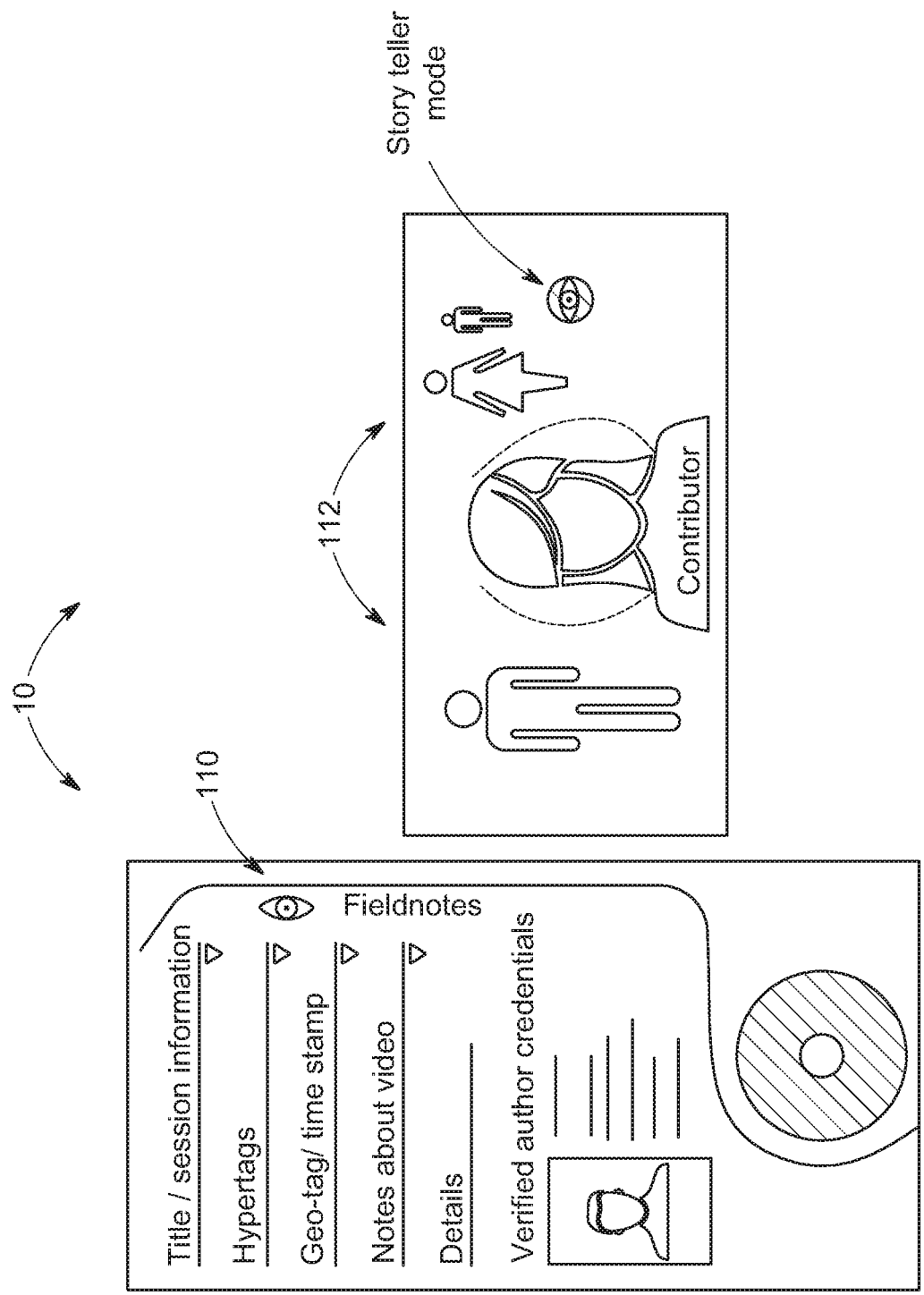
FIG. 3 is a diagram view of the fieldnotes scribing feature of the mobile communication app system of the instant invention.
Figure 5:
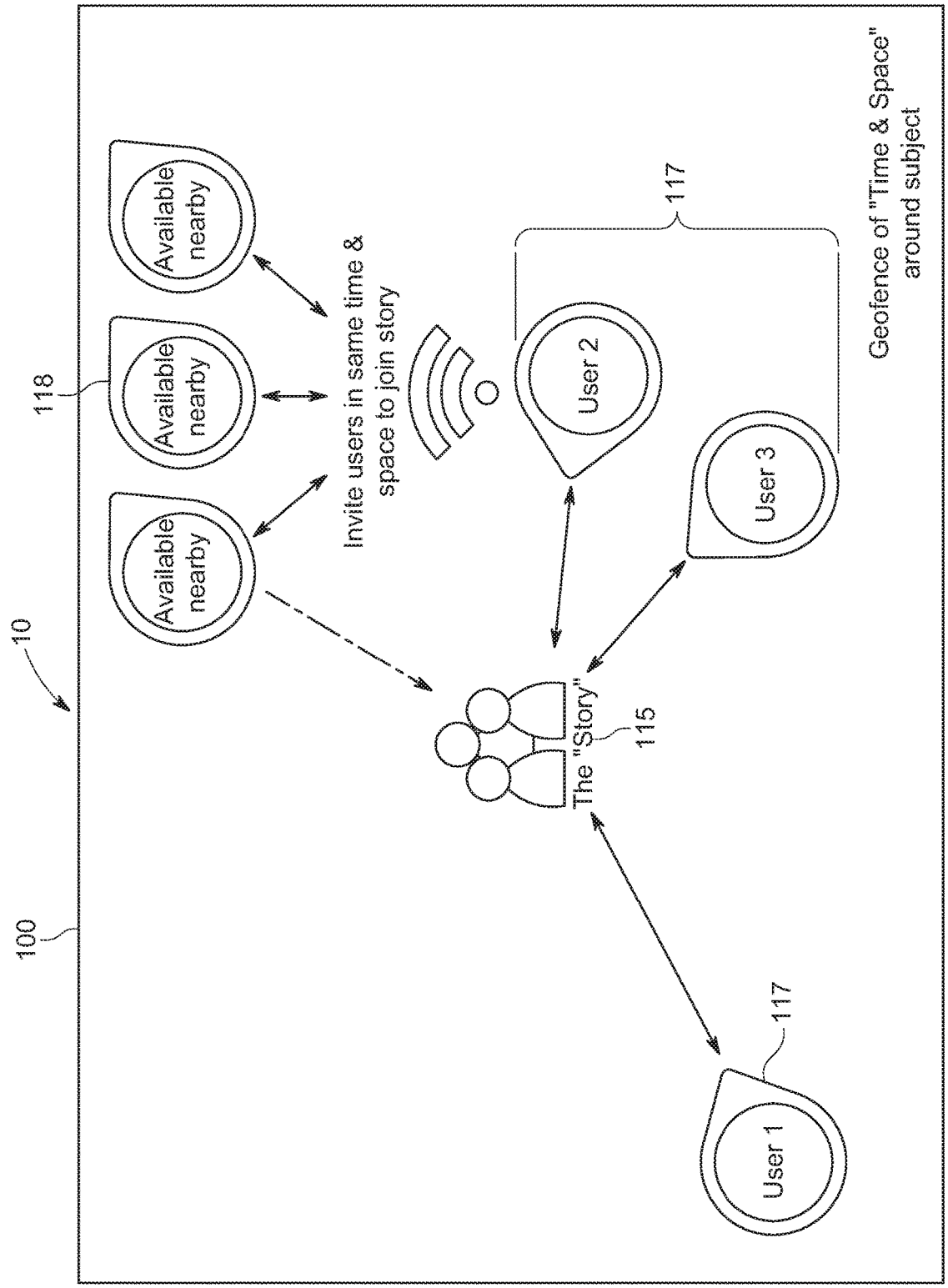
FIG. 5 is a diagram view of the video swarming feature of the mobile communication app system of the instant invention.
Figure 6:
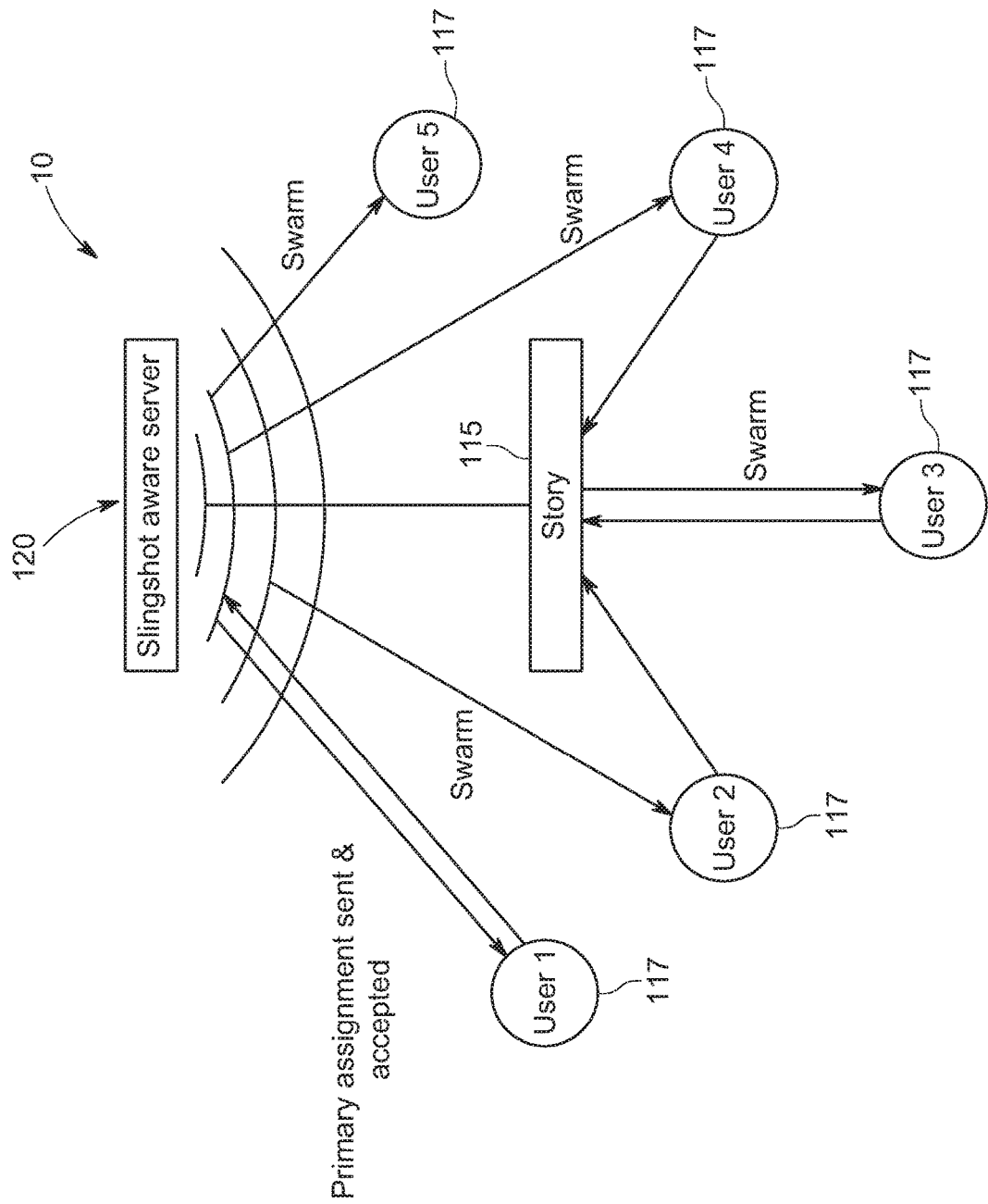
FIG. 6 is a diagram view of the video assignment and swarm feature of the mobile communication app system of the instant invention.
Figure 9:
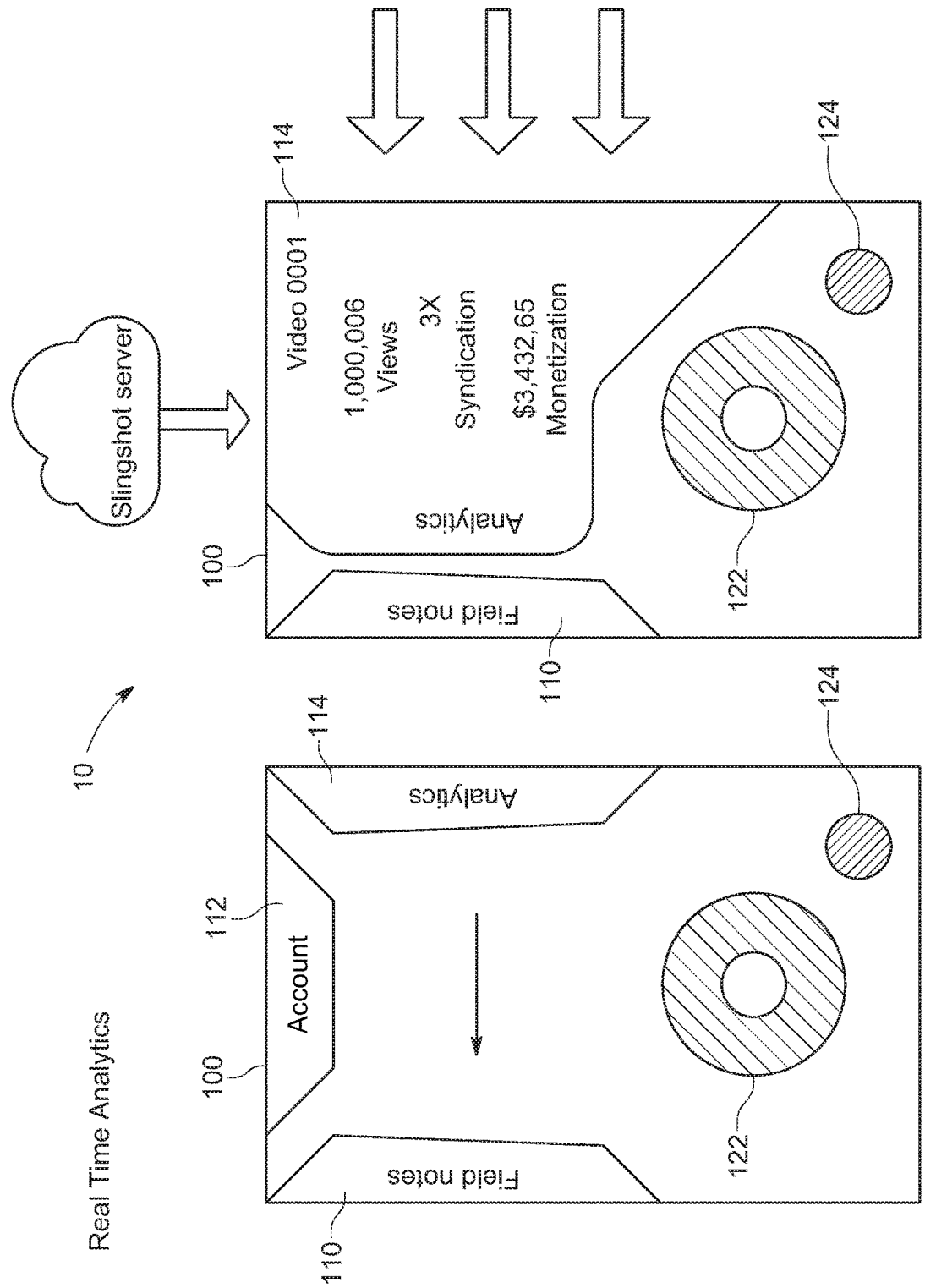
FIG. 9 is a diagram view of the real-time analytics feature of the mobile communication app system of the instant invention.
Figure 10:
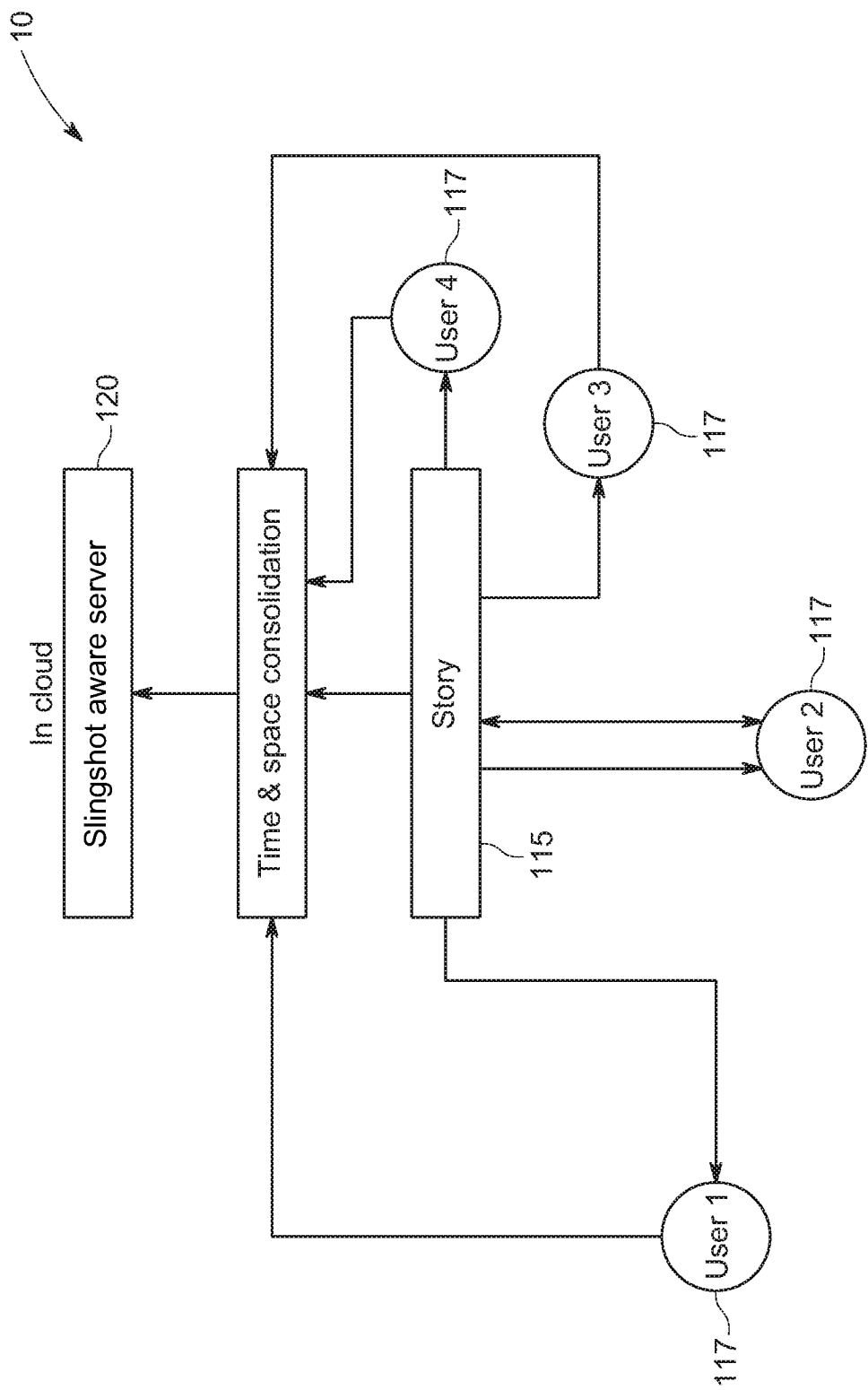
FIG. 10 is a diagram view of the time and space linkage of content feature of the mobile communication app system of the instant invention.
Figure 11:
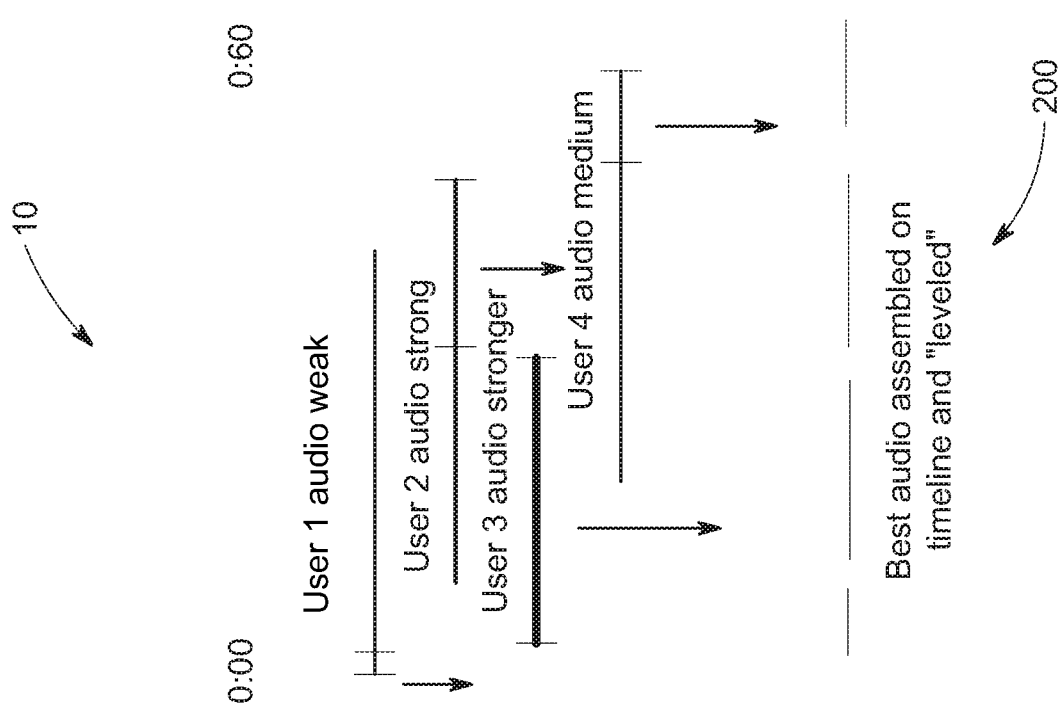
FIG. 11 is a diagram view of the audio insta-edit feature of the mobile communication app system of the instant invention.
Figure 12:
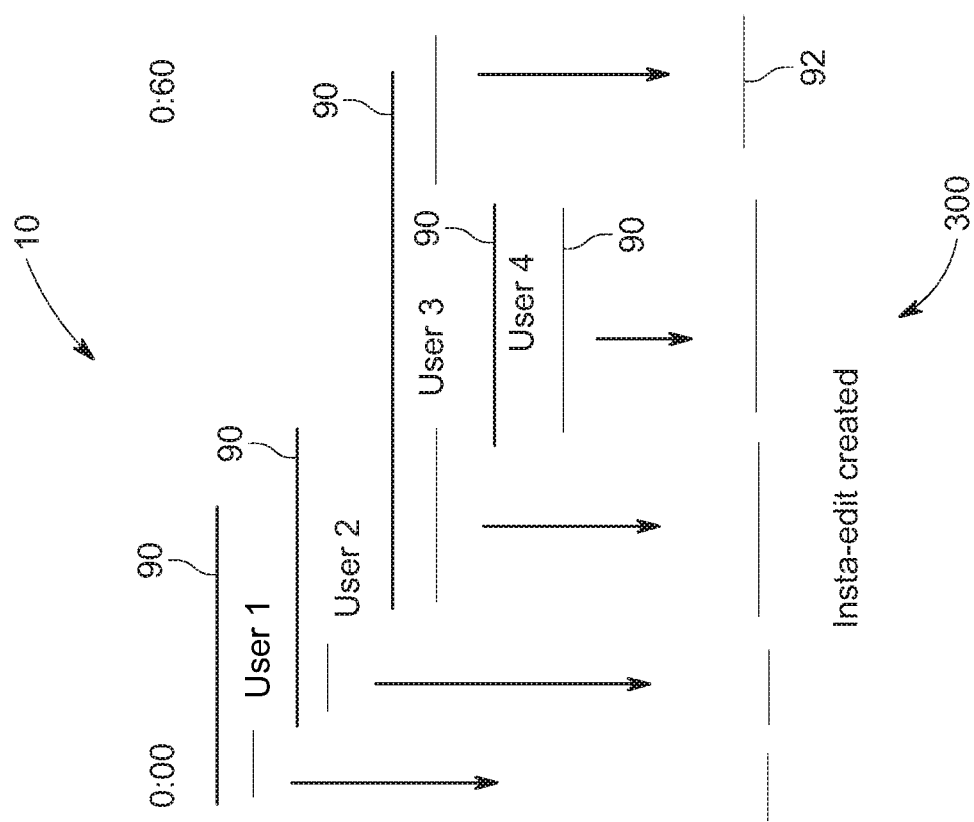
FIG. 12 is a diagram view of the image insta-edit feature of the mobile communication app system of the instant invention.

With reference to FIGS. 1A-12, the invention 10 is directed to a mobile communication device 100 having a processor and processor readable code of instructions 10, which may include software or an application ("app") for iPhones, iPads, Androids and other mobile communication devices 100 that identifies and enables multiple mobile devices 100 in a predetermined geographic region (geofence) to simultaneously record an event or scene from varying POV in the same time and space. The instant invention 10 provides an app that allows anyone with a mobile device to participate in citizen journalism and stock video. The device 10 quickly gives anyone, and preferably registered users, the ability to connect their videos in the same time and space, to automatically upload a recording to a remote server and receive virtual real-time editing, video/audio optimization, bundling with related third-party contributions, distribution, licensing, monetization and analytics about use of the video or videos uniquely captured by them. As shown in FIGS. 5 and 6, multiple users 117 in the vicinity of a developing scene or action, the "Story" 115, automatically uploads and bundles the plurality of video recordings to a remote server for editing, processing, distribution and monetization. The device 10 provides instant access to the video recording feature when opened 20 and allows a limited amount of recording time, such as up to sixty (60) seconds to record a particular event in desired region. Audio is also captured during the recording. A user 117 is given a predetermined amount of time, such as five (5) seconds, to delete the recording. With reference to FIGS. 11 and 12, the instant invention 10 streamlines and processes the collected videos and audios of the same event to remove visual and audio harmonics and irregularities. With reference to FIG. 5, the mobile communication system 10 also identifies users or mobile devices 118 nearest a preidentified area of an event or story 115 of interest and pushes an alert to these devices 118 offering a recording opportunity of the event 115 to the users which may be accepted so as to record and upload the event while encouraging proximal users 117 to also record and upload the event from their unique POV. With reference to FIGS. 11 and 12, the instant invention 100 provides instant editing to create a single recording from multiple submissions. The mobile communication device 10 may provide real time analytics 114 that allows a contributor or user 117 to view and obtain data in real time on the number of views, syndication, licensing and economic benefits. With reference to FIGS. 5 and 6, the Invention facilitates video swarming by allowing users to ping other nearby mobile devices to invite them to record an event that they are not currently recording or covering all POV's perceived as optimal. Referring to FIG. 3, users 117 may narrate the event and add field notes 110. A pixel chaser and video tagging feature of the instant invention 10 allows a contributor 117 to touch pixels of an object or person in the video 90 so as to tag the object or person for searching purposes. With reference to FIG. 10, the mobile communication system 10 may also provide session file management for "Time" and "Space" consolidation linkage of content captured for all relevant video and audio from a plurality of recordings by users 117 recording a desired event or story 115 while tracking the contributions, user ID, session ID, time stamping, geographic-stamping and quantity of POV by any particular user(s) or contributor(s) in a session which are sequential based on the upload time stamp and, or geographic stamp. The instant invention 10 may further include a worldview of the net result of the endless contributions that are made available through searchable tagging, geography, user, time and space sessions.

Figure 1B:
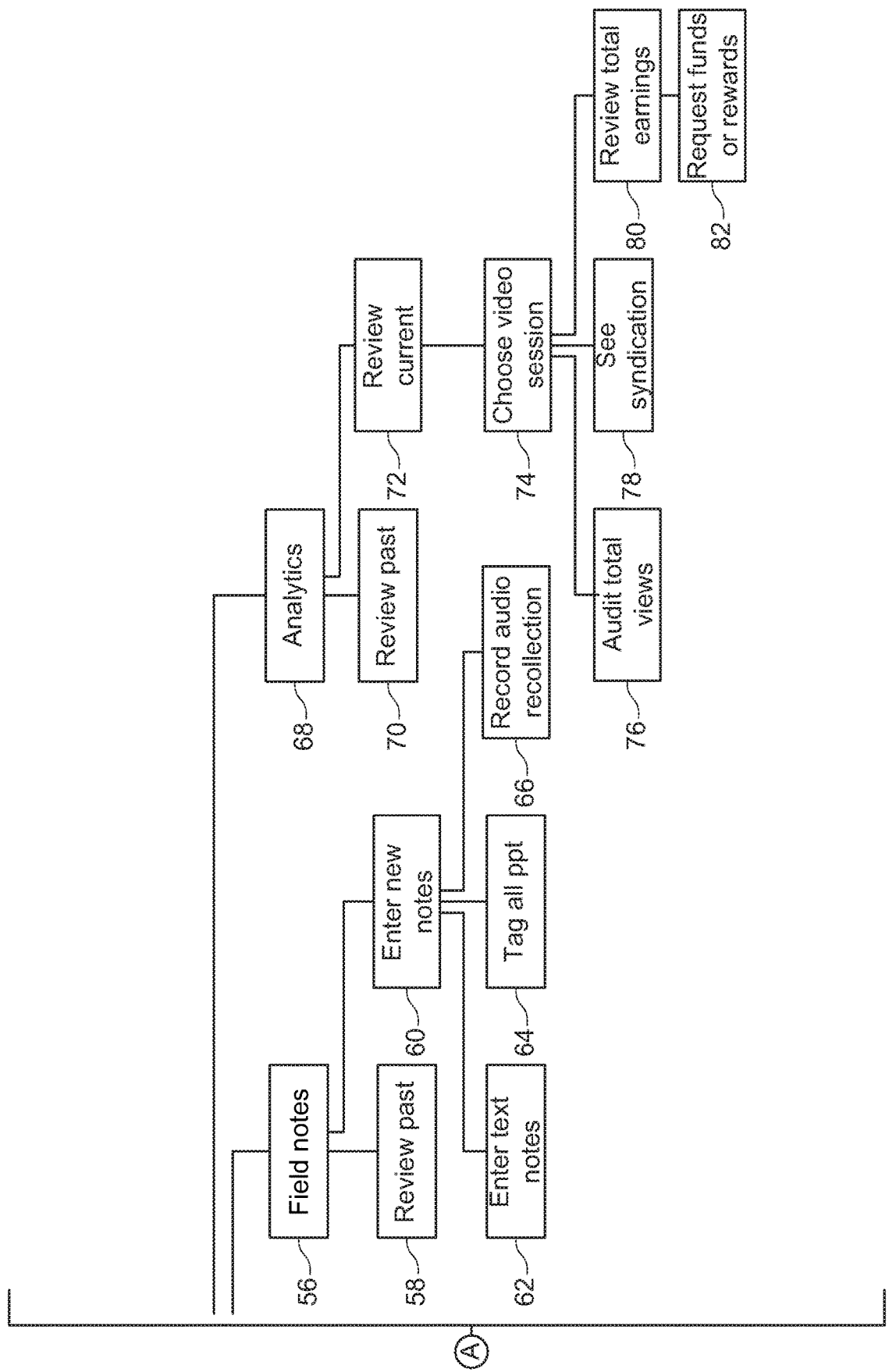
Figure 2:
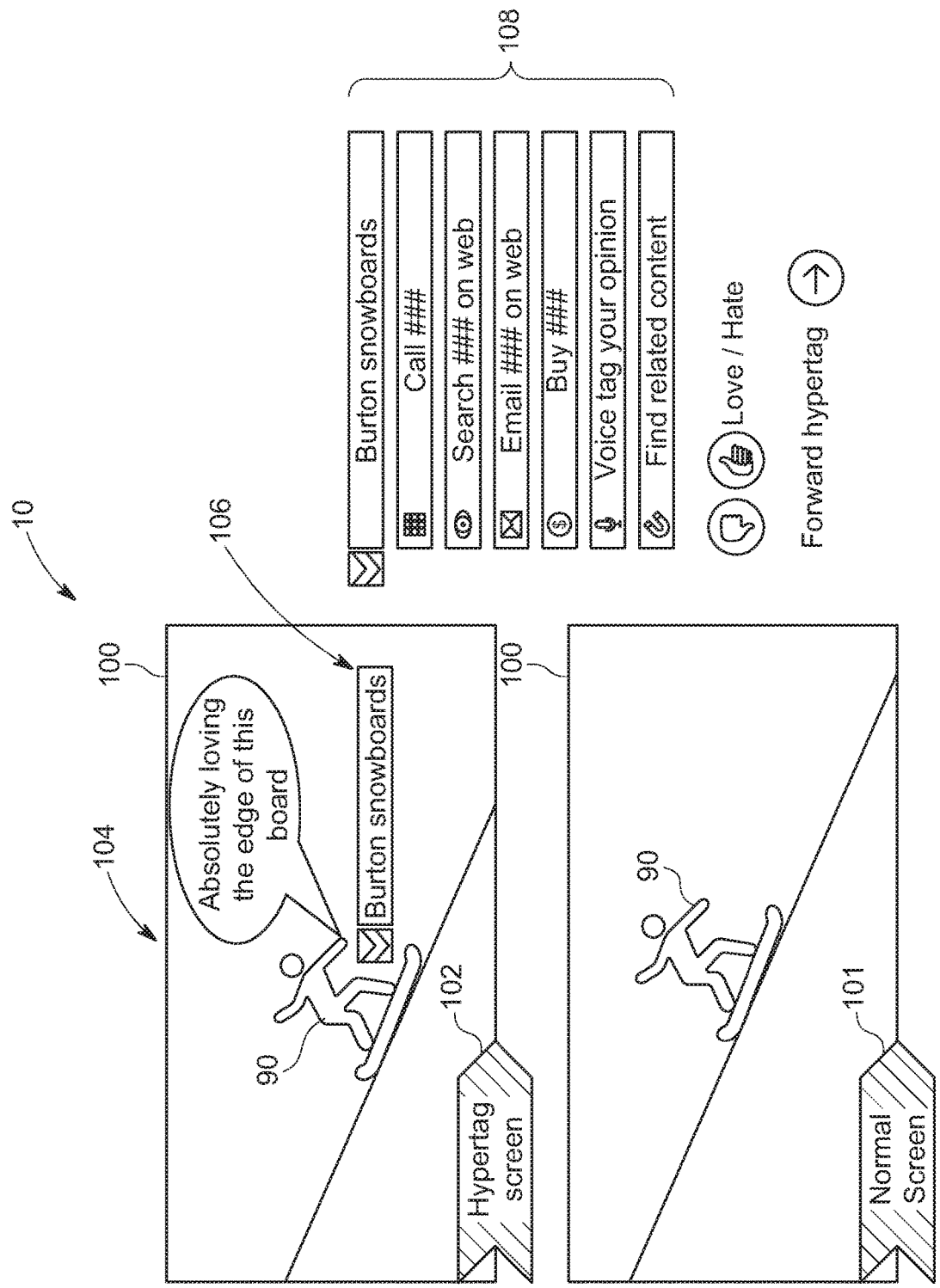
FIG. 2 is a diagram view of the hyper-tagging feature of the mobile communication app system of the instant invention.

With reference to FIGS. 1A-1B, the mobile communication system or device 10 comprises a plurality of options with corresponding steps 12-82 to navigate through and operate the device 10 of the instant invention. The first step is to open 12 the mobile communication 10. After initiating the device 10 the user selects whether they are a new user 14 or preexisting user. If the user is new, they may exit the device or app 15 or register 116. If the user successfully completes registration 116, the home page opens 20. Alternatively, if the user is an existing or preexisting user 17 they login 18 to open the home page 20. At the homepage 20, the option prompts made available include Account Settings 56, Session History 61, Record New Session 22, Field Notes 56 and Analytics 68. In the Account Settings 56 feature of the instant invention 10, the user may select the Edit Username 58 to edit their user name or the Edit Bank Info 60 to edit banking information such as banking institutions or account numbers. If account settings are changed, the user confirms these changes by selecting the Accept Updates option 62. The Session History 61 option of the app 10 includes a Review Prior Videos option 63, which if selected provides options to Delete Video from Device 68, Review Fieldnotes 70 or Review Analytics 72. When the Record New Session 22 prompt is activated, the user is given options for recording a new video.

Still referring to FIGS. 1A-1B, when selecting the prompt for recording a new video 22, options are given for recording a video for less than sixty seconds 24, a maximum of sixty seconds 36 or from multiple POV's 48. Once a video is recorded for less than sixty seconds 24 or a maximum of sixty seconds 36, options are provided for canceling or deleting the video 26/38 or automatically uploading the video 28/40 to a remote clearing or processing location. When selecting the automatic upload option 28/40, options are offered for adding POV's 30/42, inviting others to record the event or story 32/44 or to enter fieldnotes 34/46. If the Shoot Multiple POV's option 48 is selected, the automatic upload 50 option is made available and if activated, the user may elect to invite other people to record video of the event by activating the Invite Others 52 option or enter field notes by selecting the Enter Field Notes option 54.

Still referring to FIGS. 1A-1B, at the Home Page 20 options for Field Notes 56 and Analytics 68 are provided. In Field Notes 56, there are options to Review Past notes 58 or Enter New Notes 60. When selecting Enter New Notes 60, the device 10 options to Enter Text Notes 62, Tag All PRT 64 or Record Audio Recollection 66. Enter Text Notes 62 allows new field notes to be added. Tag All PRT 64 allows the tagging of people or items in the recording. The Record Audio Recollection 66 allows for the adding of field notes to audio recordings. In Analytics 68, the options are Review Past analytics 70 or Review Current analytics 72. In the Review Current 72 field, the user is given the option to Choose Video Session 74 to view the analytics for a particular recording. The Choose Video Session 74 includes an Audit Total Views 76 option for auditing the number of views, a See Syndication 78 for auditing the number of shares and a Review Total Earnings option 80 where the monetization of recorded views may be accessed to view earnings or rewards and request funds or rewards by selecting Request Funds or Rewards 82.

Referring to FIGS. 1A-12, when a user 117 opens the device or app 10 instant access to the video record feature 22 is provided where the user 117 is given up to sixty seconds to capture a video or audio recording of an event or scene from their POV that they think would be of interest to others. The user may record from multiple POV to improve the coverage of a story, event or subject matter. Audio is preferably recorded for sixty seconds even when video is not being recorded. When the recording is terminated the user 117 has up to five seconds to cancel or delete the recording 26/38. If the recording is not canceled or deleted, it is automatically uploaded to a server 28/40 where it is connected to editors, translators and a digital platform for effective and purposeful distribution and monetization. The user shares in a revenue stream that is realized from the licensing, syndication and advertisement dollars earned from use of the video recording. The user 117 and controlling entity of all uploads preferably share revenue and intellectual property from and in the video recordings submitted. All recordings uploaded are preferably archived for future use and creating a library of stock video for sale, news purposes, investigation purposes or creating a time capsule of world events that would be searchable by time, location or content. Each video recording submitted may be supported by field notes that include titling, text and, or voice summaries. Once a recording is uploaded, the analytics feature of the instant invention 10 allows a user to track real time viewership or usage as well as actual revenue earned from their contribution, Now referring to FIG. 2, the mobile communication device 10 includes a hypertag option that creates a hypertag screen 102 when activated. On the hypertag screen 102, testimonials or comments may be added to the video 90 to highlight a person, group, business or product. The hypertag screen 102 may include a drop-down menu 108 with functionality with features such as placing a call, searching online, emailing the subject, forwarding the link and its content to another, purchasing, inserting an audible opinion or finding related content. The content may also be given approval or disapproval with a "thumbs up or down." The hypertag may be forwarded. When the hypertag feature is disable, the normal screen 101 is returned.

Continuing to refer to FIG. 3, the instant invention includes the option and ability to enter field notes 110. Field notes 110 is a section or feature that allows contributors to enter a title and document a recorded event thoroughly which allows viewers to understand the subject matter, incident or content uploaded. Because of session tagging, these notes can upload even after the video ceases recording and are connected at the remote server level. With reference to FIG. 9, the field notes 110 may be activated by sliding the "Field Notes" tab. Still referring to FIG. 3, the device 10 includes a story teller feature 112 wherein the contributor is encouraged to dictate and describe the happenings of an event or subject being recorded, which may include a "selfie" or just audio. This feature of the device 10 may include guides or suggestion 112, such as centering and scaling for optimal results. The field notes 110 and story teller 112 features assist contributors in the process of recording, describing, titling and tagging their video recording session. The field notes are tagged automatically with time stamping and geotagging, which tags the recording with the time and geographic location of a recording session.

Figure 4:
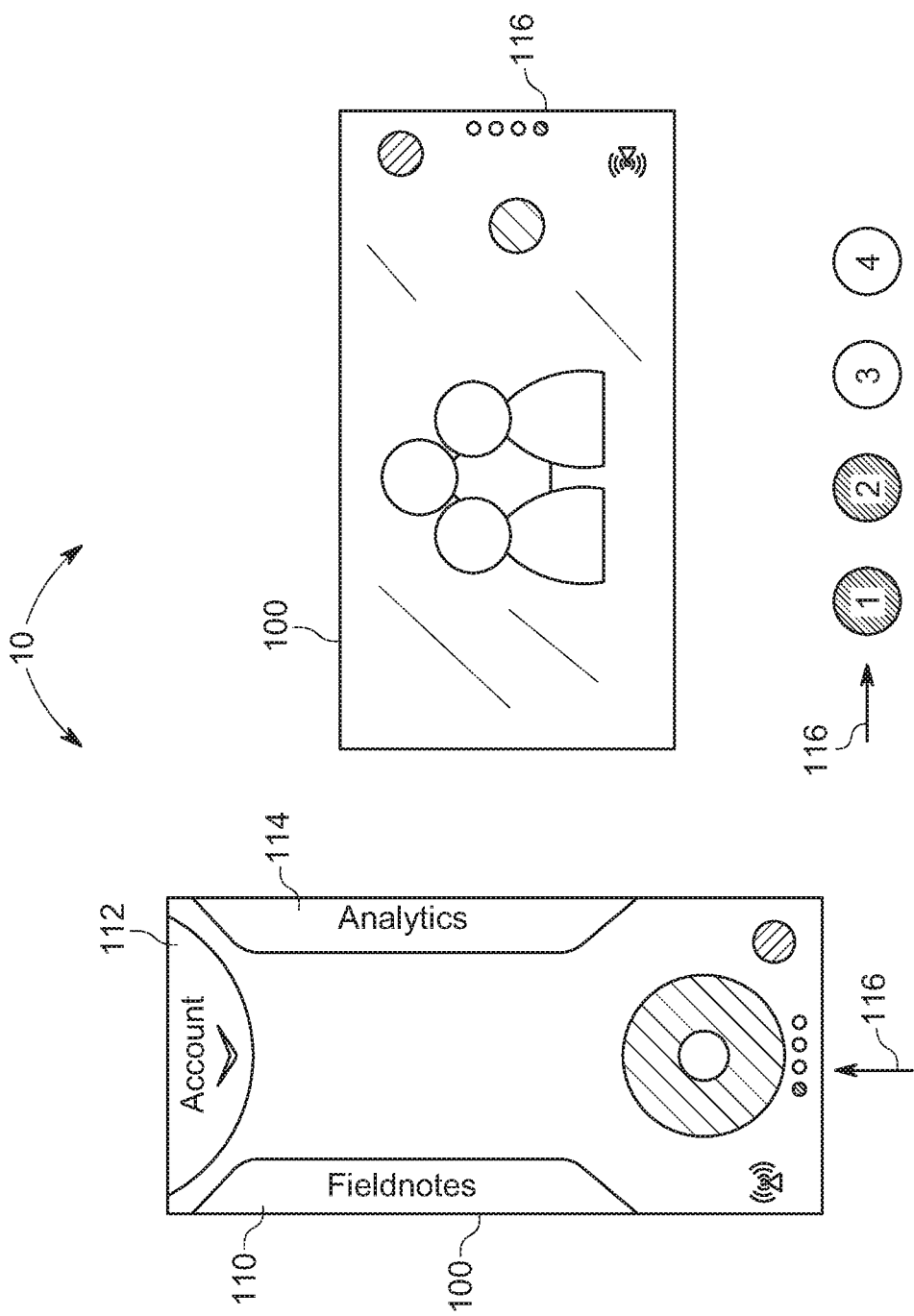
FIG. 4 is a diagram view of the multiple points of view (POV) feature of the mobile communication app system of the instant invention.

Now referring to FIG. 4, the four POV 116 is an indicator on the screen 100 that pushes or encourages one or more contributors to send a minimum of four angles and context to a story or session. The number of POV 116 may vary without departing from the scope or spirit of the instant invention. The POV indicator 116 shows the number of shots taken of a subject by a user 117 or other users 117 in the same time and space.

Now referring to FIGS. 5, 6 and 10, the mobile communication system 10 includes the ability to create and encourage video swarms of multiple users or contributors 117 recording the same event or story in the same or similar time and space. Video swarms may be created by a user or the system 10 pinging neighboring or geographically proximal users 117 identified that are not currently or actively recording the story 115 to invite or encourage them to record with financial incentives, such as sharing revenue earned, that would be paid if the invite is accepted. The mobile communication system 10 includes the linkage of content based on time and space. The linkage of multiple registered users by time and space is done by identifying those contributors closest to and best suited to cover a real-time story 115. An alert may be pushed to such users 117 to create a swarm in the interest of covering an important event not already uploaded or to encourage nearby users 117 to contribute more POV to an ongoing story 115 being covered by other contributors 117. Content may also be linked by time and space such that content from one user 117 or many users 117 covering the same subject matter or story 115 may be bundled into one session so that editing and searching the recorded story 115 and subject matter is made easier and more convenient for immediate use or archiving. Device, app and, or server based algorithms will store both Insta-edit created by algorithms as well as raw video and audio fields for those looking to create their own edit.

Figure 7:
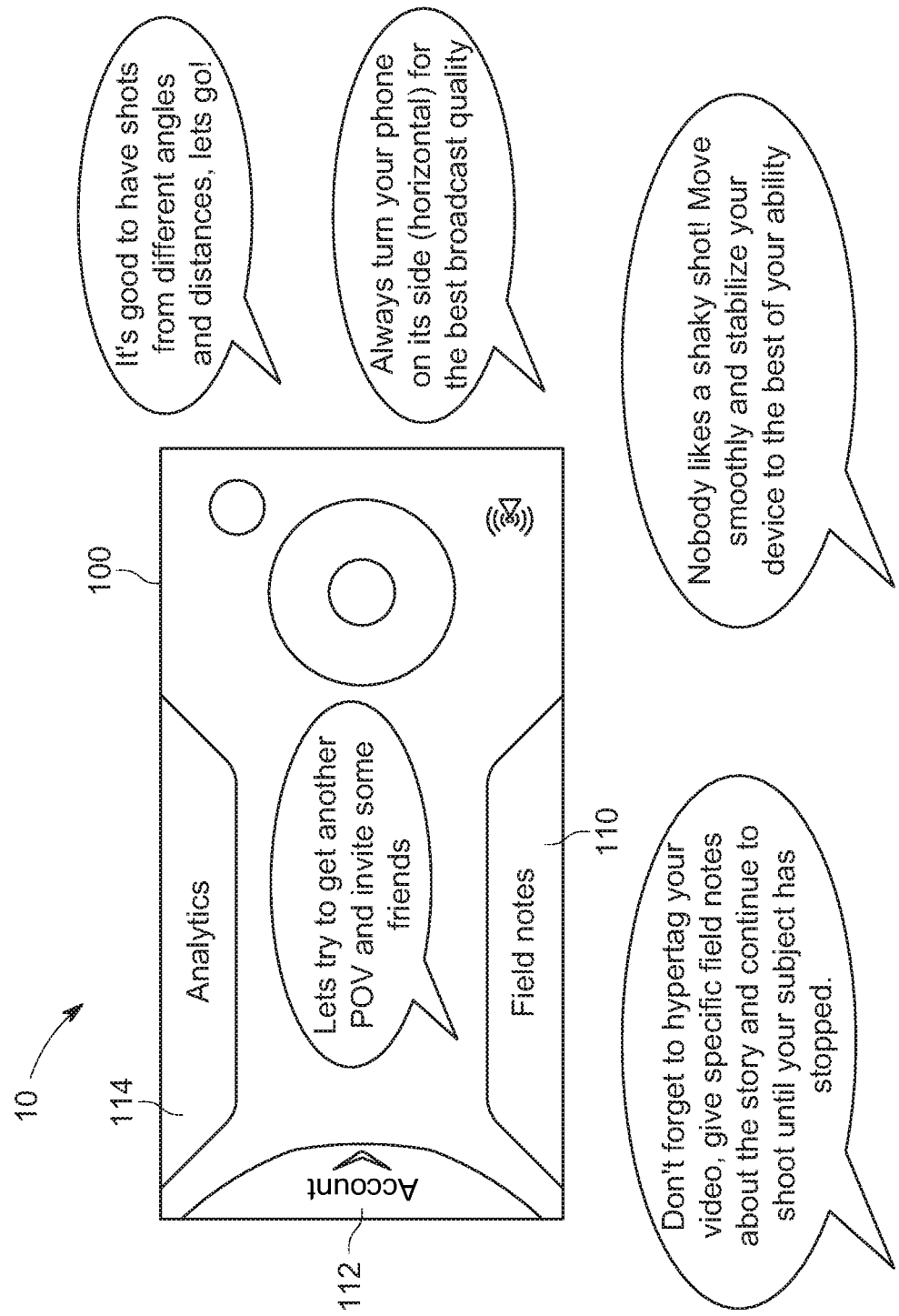
FIG. 7 is a diagram view of the citizen journalism education feature of the mobile communication app system of the instant invention.

Now referring to FIG. 7, the mobile communication device 10 includes citizen journalism education feature that educates users 117. The citizen journalism education feature is a best practices video that may be launched with the device 10 to first time users 117 to teach them how to increase the chances of their recordings being used and monetized. While a user 117 is recording, the device 10 may include suggestions that appear on the screen 100 to help a user 117 record optimally with respect to landscape, video, lighting, recording from multiple POV's, inviting others to join the recording of the story 115, recording superior field notes and, or other helpful hints. This feature may be available for the first predetermined number of recording sessions, such as ten, or made available on demand.

Figure 8:
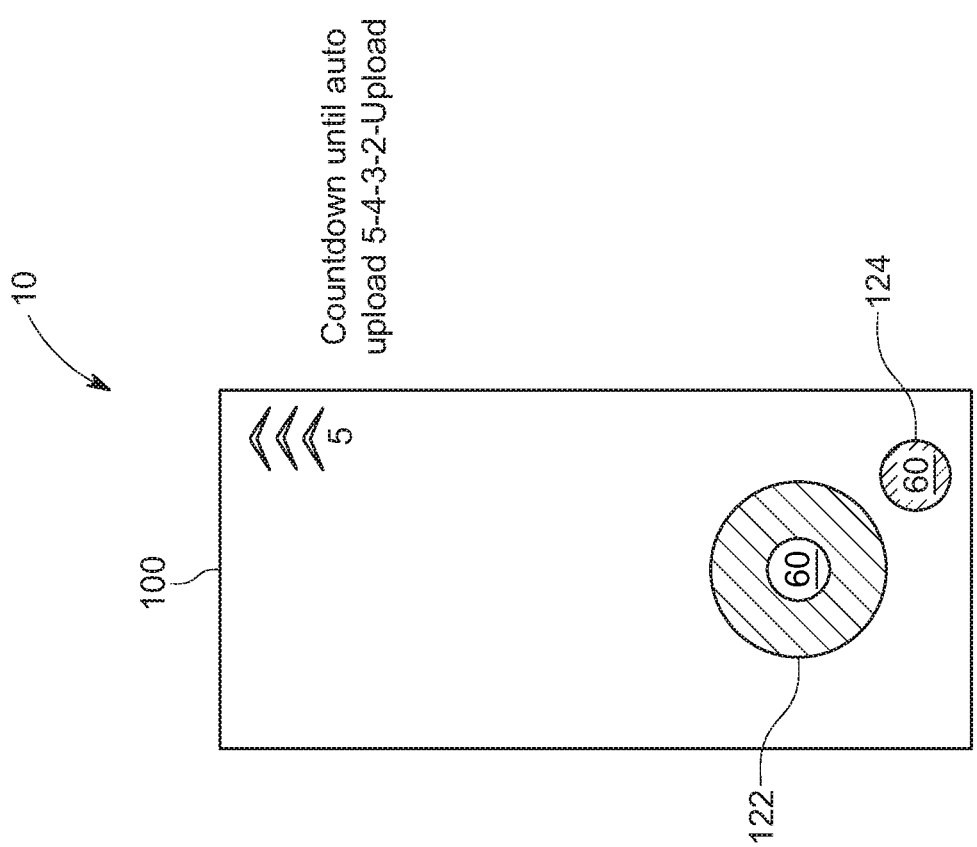
FIG. 8 a diagram view of the audio video upload feature of the mobile communication app system of the instant invention.

Now referring to FIG. 8, the mobile communication app 10 includes record button 122 that is activated to record video of an event and recording time display 124 which shows the amount of recording time left or done. The record video button 122 is always available for use to record video when activated. Audio recording time display 124 preferably does a countdown from sixty (60) for each new session. The device 10 records video of an event for a maximum of sixty seconds and continues recording audio up to sixty seconds even after a video recording is terminated before sixty seconds has run. The sixty second auto audio feature is designed to capture a maximum audio contribution even when video is less than the sixty second maximum to contribute to the ambiance and compelling story telling required in the news medium. This may also insure that the audio for the event can be matched with other video content from other contributors. The mobile communication system 10 automatically uploads a recording to a predetermined server at or after five seconds of ending the recording unless the user manually cancels or deletes the recording within those five seconds. In the absence of user intervention, the video automatically uploads to a master server or servers to be prepared, edited or processed for optimization, translation, distribution and monetization.

Now referring to FIG. 9, the mobile communication device 10 includes a real-time analytics tab and feature 114 that determines, calculates and processes in virtual real time the level of viewership, licensing and economic benefits. The analytics 114 of an active open session may be viewed in real time by sliding the "Analytics" tab 114, such as to the left as shown in FIG. 9. When the analytics 114 is opened, the current number of views, syndication or replays and monetization dollar amount of money made are displayed. To view analytics from prior sessions, the device 10 includes an account record 112 of previous sessions which may be viewed by sliding the "Account" tab 112, such as downward, to display dropdown records of previous recordings. [0052] With further reference to FIGS. 1-12, the instant invention 10 may also include pixel chaser video tagging, session file management, simulcast handshake, cortex (worldview) and a time capsule. The pixel chaser video tagging allows a contributor to touch pixels (presumably part of an object or person in the video) of a freeze-framed video to identify pixels as something that is searchable so that the tag follows the pixels and all their movement so long as the pixels/object never leaves the video frame. The session file management facilitates linkage of content as well as capturing all relevant video and audio from as many users as possible of any one event/subject while tracking contributions and therein financial gain. The session file management records, files and stores contributor/user 117 data including, user ID, session ID, time stamping, geo-stamping and quantity of POV by a particular user and others in session, which are sequential based on upload time stamp. There is preferably no maximum POV of any story 115. With the simulcast handshake, a user can be prompted through an invite requiring agreement (or automatically due to prior agreement) allowing two or more parties to share real time, like "story" or "facetime," what is being recorded by a registered contributor to simultaneously be shown as a "a live feed" for news or websites seeking the most instantaneous content available. This also allows the "producer" requesting live video to take control of the content by sending instant text direction to the contributor on location as to angles and needs as well as take control over systems allowing for remote control. It may include a live weather shot, a security camera on a house being re-positioned to see the newsworthy situation that is going on in front a house or a riot being covered and the "producer" texts that they need a wide shot from above or a closeup. Cortex may be the net result of the endless contributions that will come from the device 10 that may be available through searchable tagging, geography, user and even time and space sessions. Ultimately this is a time machine allowing future generations to see the world through every day people living everywhere. The time capsule stores all audio/video recording uploads in perpetuity as a searchable record of prior life events taking place at any time in any location.

Still referring to FIGS. 1A-12, the mobile communication system 10 has a number of noted features and advantages. For instance, the device 10 allows for simultaneously witnessing something important or newsworthy that can be captured with a mobile device. The system 10 may include hot spots that automatically push alerts to users opting in to trends or velocity contributions coming from an area they are nearby allowing them to participate. Assignments may be given wherein users 117 may be selected based on expertise to cover certain stories 115 that have been requested or that are believed to be available and of interest to certain distribution channels. Recommendations may be made on a first-come-first served open invitation to all users who neighbor or may be traveling to places and events of interest. The instant invention 10 may also offer co-author opportunities where a current contributor desires more coverage of an event or story they are covering and invites another user to record the same event by pushing an alert to them. The mobile communication device 10 of the instant invention may include quick tags wherein when a user in the field is asked first to broadly categorize their content like "breaking news", 'celebrity", "Fails", "Music related", and the like. The instant invention 10 would facilitate commercial assignments that would allow companies to post projects that thrive on numerous contributors around the world for commercial/work for hire purposes and that would allow users to opt in. Groups, teams or "tribes" could be formed that allow friends or like-minded people to work together under a group name they create and send invites to others who must accept the additional tag and identity (if they wish to join) that will relate to their content until they opt out. The device could include press credentials, such as badges that are issued directly from companies, such that if a network or business wanted direct or exclusive access to a user's content or be able to directly assign them videos they desire that there could be a monthly retainer for their work and their press pass would then show the logo of who they are working for like CNN or TMZ to authenticate them. The instant invention 10 could poll-post push a question to all users 117 to do a selfie video opining on the issue. Direct Video could be selected such that the content would be done for one specific syndicate and when both handshake on PIN that content circumnavigated the general population of content. The instant invention 10 would provide channels that allow subscribers to get stream of content and not to shop per video and if they get a following, get highest ad revenue. Also, a general forum like YouTube or a channel on YouTube will feature all content from its users without the possibility of sharing the content via a "embed code" like in YouTube so video may be used only through proper device channels and not simply appropriated as is now the habit of our future customers.

The instant invention 10 is adapted for capturing newsworthy and noteworthy stories of interest. The mobile communication app 10 simplifies distribution, syndication and monetization of some of the most important stories in the world as increasingly seen through the eyes of average people known as "citizen journalists." Contributors may be ranked based on the number of contributions, number of views, of contributions, number of syndicated pieces, most money earned and most likes. Ultimately, the aggregate of these pieces will change the face of news, stock video and time capsules showing the world as it is and was at any given time in any given location.

With reference to FIGS. 1A-12, the instant invention 10 includes the above described unique features and, or processor readable code of instructions processed by the device which are summarized in the following paragraphs for clarity. The instant invention 10 includes an author device verification feature that compares an author's entries against federal and state databases, existing social media profiles, two factor authentication thru challenges and a text message to the device being authorized to use the app that must be confirmed with self portrait, oath, a press credential that becomes an author's online ID for media purposes.

Referring to FIGS. 1A-12, the instant invention 10 includes a content verification feature achieved thru author verification and device activation, geo-tagging, time stamping (based on device time) and multi-user contributions to corroborate subject matter. It cross references subject matter from multiple sources to discover inconsistencies to identify fake news.

Referring to FIGS. 1A-12, the instant invention 10 includes a linkage of registered users by Time and Space (geo-fence) feature for effectively identifying those contributors most near and best suited to cover a real time story. An alert can be pushed to such users (creating a "Swarm") in the interest of covering something important not already being uploaded or encourage nearby users to contribute more POV's to an ongoing story by other contributors.

Referring to FIGS. 1A-12, the instant invention 10 includes an instant edit or insta-edit feature that will automatically create a real-time edit of video and audio including content being merged together from all contributors in a particular Time and Space session to create the most compelling story. It may include translations and subtitles in multiple languages. It takes content by single or multiple users in a space and combines time based audio video recorded subject matter.

Referring to FIGS. 1A-12, the instant invention 10 includes an auto video upload of live packets that is effortless and an automatic uploading of a video contribution during the capture and only replaced once a completed timeline with the same time code arrives to the server. A completed video capture session by a user also automatically uploads 5 seconds after stopping the recording or hitting the maximum 60 second session time. In the absence of user intervention the video will automatically upload to master servers to be prepared for optimization, translation, distribution and monetization.

Referring to FIGS. 1A-12, the instant invention 10 includes a sixty (60) second auto audio feature that is designed to capture a maximum video contribution even when video is less than the 60 second maximum. This is designed to contribute to the ambiance and compelling story telling required in the news medium.

Referring to FIGS. 1A-12, the instant invention 10 includes a real time multi-language translation feature that applies to a video in the form of copy at the bottom of a video edit once it is prepared for distribution. Languages currently include English, Spanish, Italian, Russian, Mandarin, Portuguese and others. The alternative translations will be selected based on an author's selection of a default language for their content contributions.

Referring to FIGS. 1A-12, the instant invention 10 includes an electronic press credentials feature that is initiated during user verification and can be verified by a third party scanning a QR code or entering a numeric sequence to query a secure and remote list of verified authors. The invention verifies user identity and compares to a database of authorized users.

Referring to FIGS. 1A-12, the instant invention 10 includes a real time analytics feature that will allow any author to witness real time their viewership, likes, licensing and monetary benefits they have created as part of their rev share agreement with the controlling entity and other third parties. These analytics are available per story, annually and cumulatively.

Referring to FIGS. 1A-12, the instant invention 10 includes a citizen journalism education feature wherein a best practices video will launch the app the first time teaching people how to increase the chances of their story "making the news" or becoming valuable. Pop ups recommending a user film a story in the optimal way including landscape video, lighting, encouraging multiple POV's, inviting others to join your story, recording superior field notes and more will happen throughout the first 10 sessions of a user and thereafter will be available on demand.

Referring to FIGS. 1A-12, the instant invention 10 includes a video swarms feature 10 that can be created by a user or the "system" pinging neighboring (geographically close) users not actively recording the story they have uncovered and them agreeing to share revenue earned (by accepting mission) via the initiators invitation to something otherwise they might not have covered.

Referring to FIGS. 1A-12, the instant invention 10 includes a 5 POV (Points of View) feature which is an on-screen indicator always pushing one or more contributors to send a minimum of 5 angles and context to one story.

Referring to FIGS. 1A-12, the instant invention 10 includes a story teller feature that is a feature wherein the contributor is encouraged to dictate what has happened either as a "selfie" in front of their camera (video) or audio only.

Referring to FIGS. 1A-12, the instant invention 10 includes a field notes features which is a section that allows contributors to title and document the event thoroughly so others can best understanding the subject/incident/content uploaded. Because of session tagging these notes can upload even after the video that may be time sensitive and connected at the remote server level.

Referring to FIGS. 1A-12, the instant invention 10 includes a pixel chaser video tagging feature that allows a contributor to touch pixels (presumably part of an object/person in video) of a freeze-framed video to identify pixels as "something searchable" so that the tag follows the pixels and all their movement so long as the pixels/object never leaves the video frame.

Referring to FIGS. 1A-12, the instant invention 10 includes a session file management feature for the purposes of Time and Space linkage of content as well as capturing all relevant video and audio from as many users as possible of any one event/subject while tracking contributions and therein financial gain we have developed a system that will file contributions including: User ID, Session ID, Time Stamping, Geo-Stamping, and quantity/# of POV by this user and by others in session (1/12, 2/12, 3/12) and they are sequential based on upload time stamp. There is no maximum POV's of any story subject.

Referring to FIGS. 1A-12, the instant invention 10 includes a hypertags feature which is much like tagging a picture or even video now in social media identifying a particular object or person, Hypertags make it possible for a viewer to click on the associated tag and get so much more than the name or click-through profile in the social media being viewed. Hypertags can allow a viewer to go to a website, donate to an associated account or reloadable card, connect a viewer to the author (email, sins, phone), connect to the object/person tagged (same), search related info and images on the web and even call someone depending on what information is filled in when creating the HYPERTAG.

Referring to FIGS. 1A-12, the instant invention 10 includes a relevance hashtags and hypertags feature wherein when a session is created in a certain time/space and/or when biometric analysis of faces in a video are recognized or object recognized there is a list of 'relevant hashtags and hypertags put at the bottom in a transparent layer over the content to be suggested as relevant to the content the user has created.

Referring to FIGS. 1A-12, the instant invention 10 includes an instaccount feature that allows a User creating content to Hypertag a person or thing in a way that a reloadable payment account is created on behalf of that person/thing and held in trust for them to collect and for a world of viewers to contribute to.

Referring to FIGS. 1A-12, the instant invention 10 includes a simulcast handshake feature wherein a user can be prompted through an invite requiring agreement (or automatically due to prior agreement) allowing two or more parties (author and third party) to share real time, like "story" or "facetime," what is being recorded by a registered author to simultaneously be shown as a "live feed" for news or websites seeking the most instantaneous content available. This would also allow a producer or director to "Takeover" requesting live in an occurring video to take control of the content by sending instant text direction to the contributor on location as to angles and needs as well as take control over\ systems allowing for remote control. Think a live weather shot, a security camera on a house being re-positioned to see the newsworthy situation that is going on in front of the house or a riot being covered and the "producer" texts that they need a wide shot from above or a closeup.

Referring to FIGS. 1A-12, the instant invention 10 includes a global live view that allows producers and editors globally to "tune into" all raw video and audio feeds being uploaded to Slingshot real time so that these contributions can be brought into live broadcasts or the most timeline of stories. Imagine a concert being broadcast live and the producer not only seeing "their cameras" but also seeing a parallel view that comes from an audience of Slingshot users making contributions real time.

Referring to FIGS. 1A-12, the instant invention 10 includes a cortex (Worldview) feature that will be the net result of the endless contributions that will come from Slingshot that will be available through searchable tagging, geography, user and even Time and Space Sessions. Ultimately this should be like a time machine allowing future generations to see the world through every day people living everywhere.

Referring to FIGS. 1A-12, the instant invention 10 includes a 360 Degree "Painting" of a scene feature so that someone investigating or curious about a particular scene could have a 360 degree and 3d view of it. Authors will be cued by a push notification to "paint" a scene by turning their mobile device and seeing what they capture real time and highlighting the areas missing so that they can continue to sweep the device over the areas needing to be captured to complete the 3d model of the scene. The goal is Global Virtual Mapping that is a personal equivalent to what Google does getting images of roads and destinations by driving their vehicles around to capture this.

Referring to FIGS. 1A-12, the instant invention 10 includes a time capsule feature wherein all video uploads should live in perpetuity as a searchable record of all things happening at any time and in any location desired, past and present. It also may include a channeling feature wherein all author content edits with watermarks and hypertags for licensing and download when shown on existing video platforms and social media platforms like.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for capturing, processing, linking and monetizing a plurality of video recordings, said system comprising:
- a plurality of mobile communication devices, each of said mobile communication devices having a housing, a video recorder, a storage database and a processor disposed in said housing, said processor being in communication with said video recorder;
- a processor readable set of instructions for each of said mobile communication devices processed by said processor of each of said mobile communication devices for initiating, storing and processing video recordings captured by each of said mobile communication devices;
- said processor readable set of instructions including:
  - a recording means, in communication with said video recorder, for activating said video recorder to capture a video recording of an event from at least one point of view (POV);
  - a storage means, in communication with said storage database, for creating and storing a video file of the event from said video recording; and
  - an uploading means, in communication with said storage database, for transferring a copy of said video file to a predetermined remote database;
- a monetization means, in communication with each of said mobile communication devices, for receiving a payment of value for uploading said video file;
- a remote server, in communication with said mobile communication devices, for receiving and editing said video recordings into a single recording; and
- a server readable set of instructions operable by said remote server for facilitating the editing of said video recordings, said server readable set of instructions including:
  - a video selection set of instructions for selecting preferred videos recorded from said mobile communication devices from a plurality of different points of view (POVs);
  - a video editing set of instructions for identifying, selecting and removing portions of said preferred videos to create edited preferred videos;
  - a merging and blending set of instructions for merging and blending said edited preferred videos into a single virtually seamless video; and
  - an audio editing means for selecting and removing portions of audio from said preferred videos to create a single audio file that coincides with said single virtually seamless video.

2. The system of claim 1, further comprising:
geographic fence means, in communication with said plurality of communication devices for identifying a geographic region to identify additional mobile communication devices.

3. The system of claim 1, further comprising hypertags.

4. A system for capturing, processing, linking and monetizing a plurality of video recordings, said system comprising:
- a central communication device having a central processor and a central set of processor readable instructions operated by said central processor and communication means for communicating with a plurality of mobile communication devices;
- a mobile communication device, in communication with said central communication device, having a housing, a video recorder, a storage database and a mobile processor disposed in said housing, said processor in communication with said video recorder;
- a mobile processor readable set of instructions processed by said mobile processor for initiating, storing and processing video recordings captured by said mobile communication device;
- said mobile processor readable set of instructions including:
  - a recording means, in communication with said video recorder, for activating said video recorder to capture a video recording of an event from a first point of view (POV);
  - a storage means, in communication with said storage database, for creating and storing a video file of the event from said video recording;
  - an uploading means, in communication with said central communication device, for transferring a copy of said video file to said central communication device;
  - a video selection set of instructions for selecting preferred videos recorded from different points of view (POVs) in real time;
  - a video editing set of instructions for identifying, selecting and removing portions of said preferred videos using artificial intelligence (AI) to create edited preferred videos;
  - a merging and blending set of instructions for merging and blending said edited preferred videos into a single virtually seamless video; and
  - an audio editing means for selecting and removing portions of audio from said preferred videos to create a single audio file that coincides with said single virtually seamless video;
- a monetization means, in communication with said central communication device and said mobile communication device, for sending a payment of value to said mobile communication device for uploading said video file.

5. The system of claim 4, further comprising:
- a second mobile communication device, in communication with said central communication device, having a second housing, a second video recorder, a second storage database and a second processor disposed in said second housing, said second processor in communication with said second video recorder;
- a second processor readable set of instructions processed by said second processor for initiating, storing and processing video recordings captured by said second mobile communication device;
- said second processor readable set of instructions including:
  - a second recording means, in communication with said second video recorder, for activating said second video recorder to capture a second video recording of the event from a second POV;
  - a second storage means, in communication with said second storage database, for creating and storing a second video file from said second video recording; and
  - an uploading means, in communication with said central communication device and said second storage database, for transferring a copy of said second video file to said central communication device;
- a monetization means, in communication with said central communication device and said second mobile communication device, for receiving a payment of value for uploading said second video file.

6. The system of claim 4, further comprising:
a bundling means, in communication with said central communication processor and operated by said central processor, for combining and processing said first video file and said second video file to create a third video file.

7. The system of claim 5, further comprising:
geographic fence means, in communication with said central, first and second mobile communication devices for identifying a geographic region to identify additional mobile communication devices.

8. The system of claim 6, further comprising:
a monetization means, in communication with said central processor and said first and second processors, for assigning a value to said first and second video files and providing said value to a first predetermined financial account and a second financial account.

9. The system of claim 4, further comprising hypertags.

10. A system for capturing, processing, linking and monetizing a plurality of video recordings, said system comprising:
- a central communication device having a central processor and a central set of processor readable set of instructions operated by said central processor and communication means for communicating with a plurality of mobile communication devices;
- a mobile communication device, in communication with said central communication device, having a housing, a video recorder, a storage database and a mobile processor disposed in said housing, said processor in communication with said video recorder;
- a mobile processor readable set of instructions processed by said mobile processor for initiating, storing and processing video recordings captured by said mobile communication device;
- said mobile processor readable set of instructions including:
  - a recording means, in communication with said video recorder, for activating said video recorder to capture a video recording of an event from a first point of view (POV);
  - a storage means, in communication with said storage database, for creating and storing a video file of the event from said video recording; and
  - an uploading means, in communication with said central communication device, for transferring a copy of said video file to said central communication device;
- a monetization means, in communication with said central communication device and said mobile communication device, for sending a payment of value to said mobile communication device for uploading said video file;
- a second mobile communication device, in communication with said central communication device, having a second housing, a second video recorder, a second storage database and a second processor disposed in said second housing, said second processor in communication with said second video recorder;
- a second processor readable set of instructions processed by said second processor for initiating, storing and processing video recordings captured by said second mobile communication device;
- said second processor readable set of instructions including:
  - a second recording means, in communication with said second video recorder, for activating said second video recorder to capture a second video recording of the event from a second POV;
  - a second storage means, in communication with said second storage database, for creating and storing a second video file from said second video recording; and
  - an uploading means, in communication with said central communication device and said second storage database, for transferring a copy of said second video file to said central communication device;
- said central processor readable set of instructions including:
  - a video selection set of instructions for selecting preferred videos recorded from different points of view (POVs);
  - a video editing set of instructions for identifying, selecting and removing portions of said preferred videos to create edited preferred videos;
  - a merging and blending set of instructions for merging and blending said edited preferred videos into a single virtually seamless video; and
  - an audio editing means for selecting and removing portions of audio from said preferred videos to create a single audio file that coincides with said single virtually seamless video; and
- a monetization means, in communication with said central communication device and said second mobile communication device, for receiving a payment of value for uploading said second video file.

11. The system of claim 10, further comprising:
a bundling means, in communication with said central communication processor and operated by said central processor, for combining and processing said first video file and said second video file to create a third video file.

12. The system of claim 11, further comprising:
geographic fence means, in communication with said central, first and second mobile communication devices for identifying a geographic region to identify additional mobile communication devices.

13. The system of claim 12, further comprising:
a monetization means, in communication with said central processor and said first and second processors, for assigning a value to said first and second video files and providing said value to a first predetermined financial account and a second financial account.

14. The system of claim 10, further comprising hypertags.

* * * * *